H. FOSS.
SOUND INTENSIFIER FOR TELEPHONE MOUTHPIECES AND THE LIKE.
APPLICATION FILED AUG. 24, 1909.
1,011,045.
Patented Dec. 5, 1911.
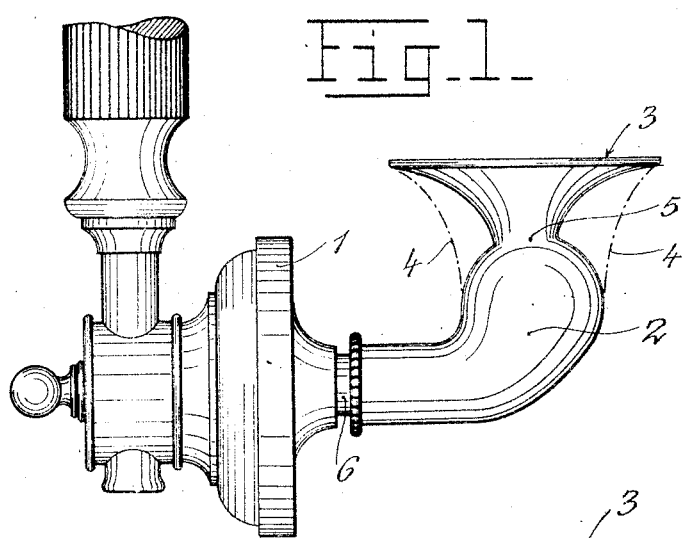
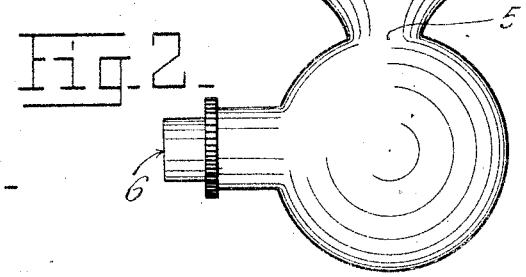
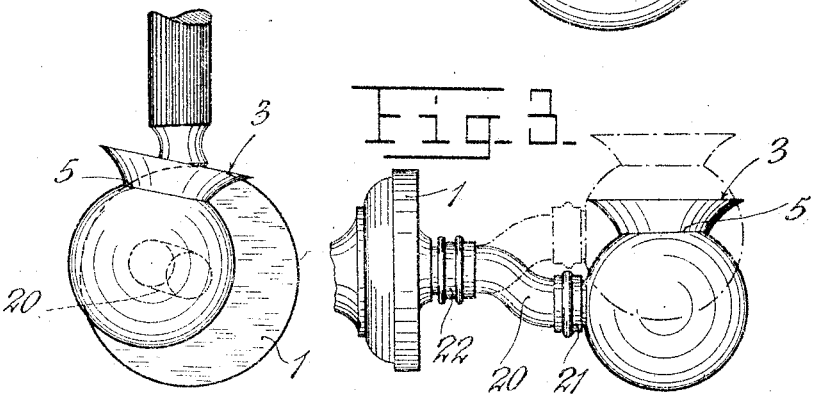
Witnesses:
Inventor:
H. Foss
by H. van Dedemmel
Attorney

UNITED STATES PATENT OFFICE.

HERMAN FOSS, OF DOMBAAS, NORWAY.

SOUND-INTENSIFIER FOR TELEPHONE-MOUTHPIECES AND THE LIKE.

1,011,045.  Specification of Letters Patent.  Patented Dec. 5, 1911.

Application filed August 24, 1909. Serial No. 514,395.

*To all whom it may concern:*

Be it known that I, HERMAN FOSS, a citizen of Norway, and resident of Dombaas, Gudbrandsdalen, in the Kingdom of Norway, have invented certain new and useful Improvements in Sound Intensifiers for Telephone-Mouthpieces and the Like, of which the following is a specification.

This invention relates to arrangements for effectively increasing the action of the sound waves on a microphone membrane, thereby improving the clearness of speech, more particularly in the case of telephoning over long distances.

The invention may also be applied to other similar sound transmitting apparatus, and consists in having the mouth-piece reduced, at its open end, to a single narrow opening. The mouth-piece thus forms a practically closed sound box which communicates with the membrane casing through a similar single narrow opening. Experiments have shown that the sound is considerably intensified by such an arrangement.

The invention also consists in the improved sound intensifying arrangements hereinafter described and claimed.

In the accompanying drawings, illustrating the invention by way of example, Figure 1 shows the lower end of a telephone apparatus with a mouth-piece of my new construction. Fig. 2 is a side elevation showing a mouth-piece of spherical shape. Figs. 3 and 4 are, respectively, a side elevation and a front view of an adjustable spherical mouth-piece.

Referring to Fig. 1, the membrane casing —1— is provided with a mouth-piece —2— which itself, instead of being formed in the usual manner as shown by the dotted lines —4—, is reduced in diameter near the open end —3—, the contracted part —5— forming a single and comparatively-narrow opening which leads to the sound box proper of the mouth-piece, said sound box being also connected through a similar single narrow opening —6— with the membrane casing 1. It has been found that, by this arrangement, the action of the sound waves on the membrane is considerably increased as compared with the usual mouth-piece.

Fig. 2 shows a modified form of construction similar to the construction shown in Fig. 1, the sound box proper being spherically shaped. This shape has proved very satisfactory, and is preferred for that shown in Fig. 1.

Figs. 3 and 4 show a form of construction of an adjustable mouth-piece of spherical form, as above described with reference to Fig. 2. The spherically shaped mouth-piece is connected with the membrane casing —1— by means of a bent tube —20— which can be rotated at —21— and —22—, so that by rotating said tube the opening —3— of the mouth-piece may assume any position between the two extreme positions indicated by dotted lines.

Having now described my invention, what I claim as new and desire to secure by Letters Patent is:

In a mouth-piece for telephones or the like, a spherically shaped sound box having a single contracted opening leading to the membrane casing and a single contracted opening connected with the atmosphere and the axis of which forming an angle of about 90° with that of the first mentioned opening.

In testimony whereof I have signed my name to this specification in the presence of two subscribing witnesses.

HERMAN FOSS.

Witnesses:
 AXEL LAHN,
 MAGNUS BRIGGS.